Patented May 22, 1928.

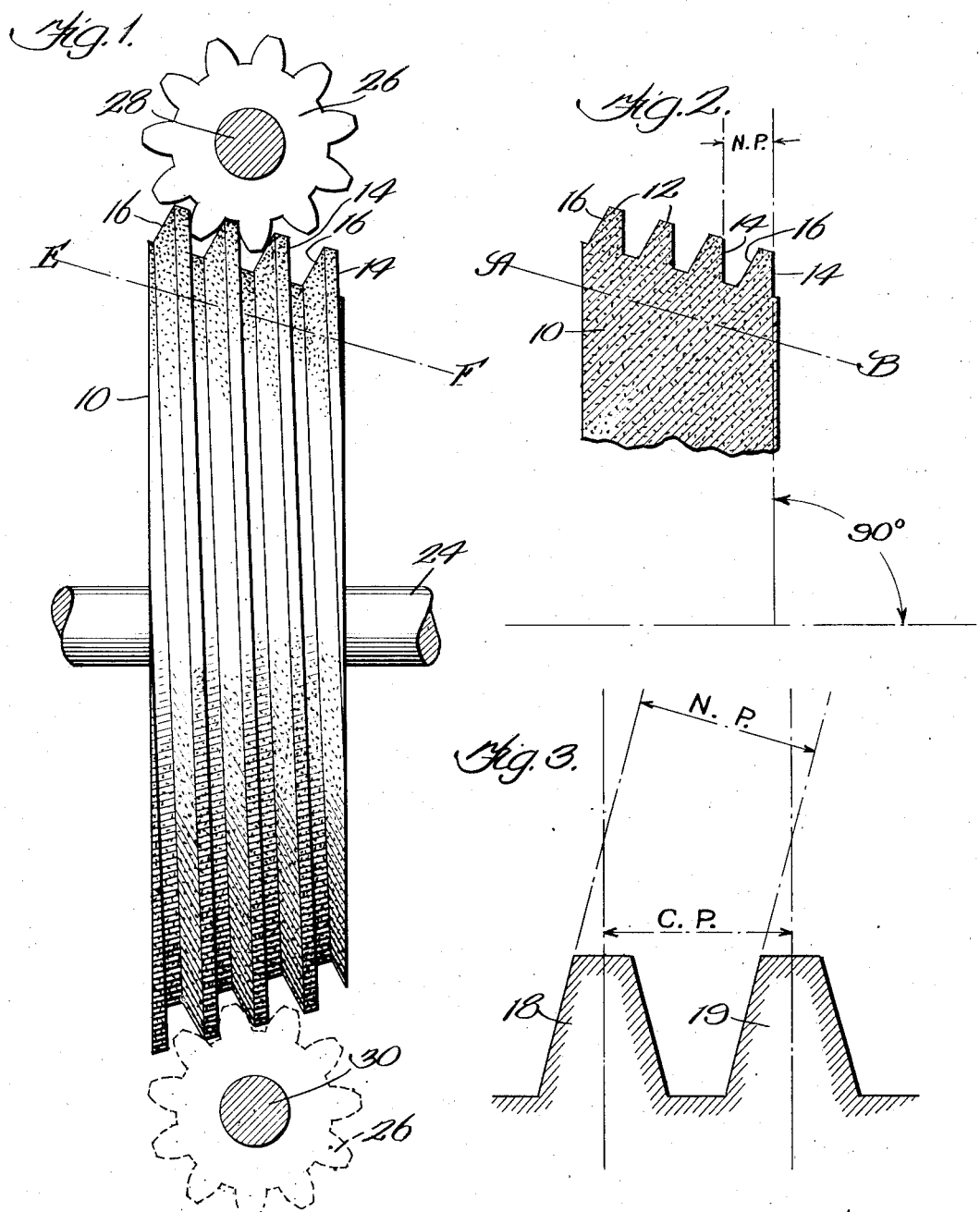

1,670,479

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

ABRASIVE HELICOID.

Application filed July 12, 1924. Serial No. 725,738.

My invention relates to grinders, especially for grinding or truing the teeth of involute spur gears, and also for grinding the teeth of the generating type of spur gear cutters such as are used in the Fellows gear shaper. These cutters are illustrated in Pat. #676,226 to E. R. Fellows.

It is known that the teeth of such gears and cutters can be ground by means of disc wheels having one flat side, for example as shown in Pat. #686,599 to E. R. Fellows. The use of such discs, however, requires the indexing of the gear from tooth to tooth and is therefore necessarily slow and inaccurate.

The object of my invention is to provide a grinder so constructed that the indexing of the work becomes unnecessary.

Generally speaking, I accomplish my object by employing a grinding helicoid of special configuration. I am aware that grinding helicoids are not basically new, being shown for example in Smith Patent #1,049,161, but the grinding helicoids heretofore employed, so far as I am aware, if used for the grinding of ordinary spur gear wheels, as distinguished from worn wheels, require that there shall be relative movement between the grinding element and the work, in a direction parallel to the axis of the work.

Another object of my invention is to provide a grinder so constructed that such axial movement may be dispensed with and the grinding completed while the grinder remains in place and the work remains in place except for their rotary motion about their respective axes. In other words, my purpose is to provide a grinder which will produce a practically true involute surface on an involute gear of ordinary width without indexing and will finish grinding one side of all the teeth as a continuous operation and with both the grinder and the gear rotating in situ, thus avoiding the need of providing for a motion of translation either for the grinder or for the work.

I accomplish these objects by the use of a wheel having a helicoidal thread, one side of which is perpendicular to the axis of the grinding wheel and, therefore, is analogous to a flat disc grinder but embodies the advantages of a hob in the sense that the action is continuous and indexing of the work becomes unnecessary. Theoretically there is a slight warpage in this flat side of the helicoidal thread, but this warpage in the area that actually comes into contact with the gear teeth, is of such small proportion that for all practical purposes it may be disregarded.

I accomplish my objects by the construction illustrated in the accompanying drawings in which Figure 1 is a side elevation of a helicoidal grinder embodying my invention. This is shown in the act of grinding the teeth of an involute gear wheel. The gear wheel shown in dotted lines at the bottom of the figure is shown for the purpose of illustrating the fact that while the grinder operates upon only one side of the teeth at a given setting, the same grinder may be employed for grinding the opposite side of the gear teeth by transferring the gear to the diametrically opposite side of the grinder.

Figure 2 is a fragmentary sectional view showing the profile of the worm or helicoid upon the grinder.

Figure 3 is a diagram to illustrate what is meant by the terms "circular pitch" and "normal pitch".

Like numerals denote like parts in the several views.

In the form selected to illustrate the invention, the grinder has a body 10 which is conical in its general configuration and has formed upon it an abrasive, helicoidal thread or worm 12. It is desirable that the diameter of the grinder be large compared to the diameter of the work. For example a 24" diameter wheel would be suitable for a spur gear of 8 to 10 diametral pitch, and a larger grinding wheel could be used to advantage for larger pitches; but there would be no disadvantage in using the largest wheel for which the hobbing machine is designed for grinding gears of the smaller pitches. The reason for employing relatively large grinding wheels is that it reduces the percentage of warpage in the grinding surface acting upon the work. The purpose in forming the grinding thread or helicoid upon a conical body is to obtain clearance and to make it possible to present a maximum amount of surface to the work, during the grinding of the side of any given gear tooth.

In other words a grinder having a conical body will make use of the maximum amount of grinding surface, thus spreading the duty which the grinder is called upon to perform over the maximum amount of area of the grinder, usually two or three turns of the helicoid acting upon the gear simultaneously.

The side 14 of the helicoid is perpendicular to the axis of rotation as best illustrated in Figure 2. The slope of the opposite side 16 is preferably such that when considered with reference to a line having the same obliquity as the side of the cone which forms the body of the grinder, it will have the same obliquity with reference to the said line as does the side 14. When thus constructed, the side 16 may be used for roughing purposes as hereinafter pointed out, but this is not essential for the side 16 may slope at any other angle small enough to prevent interference with the gear teeth, and great enough to give the necessary strength to the helicoid.

The distance between two adjacent turns of the acting side of the grinding helicoid is preferably equal to the normal pitch of the gear to be ground for this will introduce a condition in which a greater portion of the grinding surface is presented tangential to the tooth curve.

For the purpose of defining what I mean by the term "normal pitch" as applied to my grinder I have prepared a diagram, Figure 3, in which there are shown in profile two teeth, 18, 19, which represent the equivalent rack to the involute teeth of the work. These teeth 18, 19 are the same as what is shown above the line A—B Figure 2. The circular pitch indicated by the line C—P Figure 3, represents the distance, measured axially, between the centers of two adjacent teeth, whereas the "normal pitch" indicated by the line N—P Figure 3 represents the distance between two adjacent analogous surfaces on the rack, measured at right angles or normal to such surfaces.

By reference to the line E—F in Figure 1 which is drawn to have the same obliquity with reference to the grinder axis as the side of the cone which forms the body of the grinder, it will be evident that if this line E—F were considered as the bottom surface of a rack, the helicoid, in profile, will correspond to rack teeth and the work will occupy the same relation to it as is usual in the ordinary molding generating process. The degree of obliquity of the non-acting side of the grinder helicoid may be varied, as previously pointed out, but the above statement holds true as to the acting side of the grinder when the latter is made in accordance with the preferred design.

It may be observed that if we measure the distance between adjacent acting surfaces of the helicoid along a line parallel to the line E—F Figure 1 the distance between said turns will be equal to the circular pitch of the gear, whereas if the distance is measured in an axial direction, that is, in a direction parallel to the axis of rotation of the helicoid the distance will be equal to the normal pitch of the gear.

In practice the helical grinder will be used in a hobbing machine and in fact my device might properly be referred to as a "grinding hob." Hobbing machines are well known and need not be here described except to say that in such machines the hob and the work are mounted on spindles which are arranged approximately crosswise and are rotated in timed relation. In the present case my grinding hob is shown mounted on a hob spindle or tool spindle 24. The work, here shown in the form of an involute spur gear wheel 26, is mounted upon a work spindle 28 for grinding one side of the gear teeth. When this side has been finished the gear will be transferred to a second work spindle 30 for grinding the opposite side of the teeth. These two work spindles are arranged on opposite sides of the grinder, and while their general direction is crosswise of the tool spindle 24 there is a slight obliquity to compensate for the helix angle of the acting side of the grinding helicoid. The obliquity is slight, however, owing partly to the large diameter of the hob and partly to the characteristic that the acting side of the helicoid is perpendicular to the axis.

In operation, the two spindles 24, 28 will rotate in timed relation and as the acting side 14 of the helicoid is substantially a plane surface, the warpage within the limits of the width of the gear being negligible, the grinder will act upon a line extending across the full width of the gear wheel: this in distinction to the theoretically point-contact resulting with the type of helicoidal grinders heretofore known. Consequently, in my case, the rolling action which occurs during the timed rotation of the two spindles 24, 28 will ultimately cause the grinder to pass over the entire side of the gear teeth, one after the other, and completely finish the work without requiring any indexing of the work. The analogy to the coaction of a rack and gear will be evident if reference is made to the parts shown above the line E—F Figure 1. By constructing the grinder in the manner described the work will be acted upon by two or three turns of the grinder helicoid simultaneously.

As previously stated, when one side of the gear teeth has been dressed the gear will be removed from the work spindle 28 and placed upon the work spindle 30. As a matter of fact, in practice, to save time gears will be mounted on both of the work spindles at the same time so that the grinder may operate upon them simultaneously.

While the flat side only of my grinder is ordinarily employed for final finishing of the gear wheel, it is nevertheless true that if the non-acting side of the grinding helicoid is configurated in the manner shown and described its inaccuracy will be comparatively slight and it may be utilized for roughing out the gear in those cases where the inaccuracies of the gear are such as to render a roughing as well as a finishing operation advisable.

Having thus described my invention, what I claim as new and desire to secure by Letters Patent is:

1. A grinding wheel having a helicoidal thread, one side of which is so arranged that the axis of rotation is normal to it, said thread being mounted upon a conical body.

2. A grinding wheel having a helicoidal thread formed upon a conical body, the included angle formed by the sides of the helicoid being the same as the included angle formed by the side of the cone.

3. A grinding wheel for thin involute gears, having a conical body with the helicoidal thread formed thereon, the profile of the thread being a rack tooth both sides of which have the same pressure angle with respect to the surface of the cone, and the angle of the cone being the same as the pressure angle of the tooth to be dressed, one side of the thread being perpendicular to the axis of the grinding wheel when viewed in profile.

In witness whereof, I have hereunto subscribed my name.

CARL G. OLSON.